(12) United States Patent
Wilson

(10) Patent No.: US 7,926,516 B2
(45) Date of Patent: Apr. 19, 2011

(54) INTERNAL COMPOSITE REPAIR APPARATUS

(75) Inventor: Jeffrey M. Wilson, Tulsa, OK (US)

(73) Assignee: TDW Delaware, Inc., Wilmington, DE (US)

( * ) Notice: Subject to any disclaimer, the term of this patent is extended or adjusted under 35 U.S.C. 154(b) by 175 days.

(21) Appl. No.: 12/411,138

(22) Filed: Mar. 25, 2009

(65) Prior Publication Data

US 2010/0243093 A1    Sep. 30, 2010

(51) Int. Cl.
*F16L 55/16* (2006.01)

(52) U.S. Cl. .............. 138/98; 138/97; 138/93; 264/269; 156/287; 405/150.1

(58) Field of Classification Search ............ 138/98, 138/97, 90, 93; 264/269; 156/287, 94; 405/150.1
See application file for complete search history.

(56) References Cited

U.S. PATENT DOCUMENTS

| | | | | |
|---|---|---|---|---|
| 3,103,235 A | * | 9/1963 | Stringham, III | 138/97 |
| 3,125,646 A | | 3/1964 | Harmes | 138/90 X |
| 3,194,466 A | | 7/1965 | Davis | 228/42 |
| 3,269,421 A | * | 8/1966 | Telford et al. | 138/97 |
| 3,618,639 A | * | 11/1971 | Daley et al. | 138/97 |
| 3,762,446 A | * | 10/1973 | Tungseth et al. | 138/97 |
| 3,834,422 A | | 9/1974 | Larson | 138/97 |
| 3,946,761 A | * | 3/1976 | Thompson et al. | 138/98 |
| 3,958,607 A | * | 5/1976 | Gray | 138/97 |
| 3,977,360 A | | 8/1976 | Mihaly | 118/408 |
| 4,415,390 A | | 11/1983 | Smith | 156/187 |
| 4,504,204 A | | 3/1985 | Koga | 425/11 |
| 4,572,228 A | * | 2/1986 | Larson et al. | 137/15.11 |
| 4,589,447 A | | 5/1986 | Kane et al. | 138/98 |
| 4,774,905 A | | 10/1988 | Nobis | 118/304 |
| 6,241,424 B1 | | 6/2001 | Bath et al. | 405/156 |
| 6,276,401 B1 | | 8/2001 | Wilson | 138/172 |
| 6,752,175 B1 | | 6/2004 | Willschuetz et al. | 138/90 |
| 2002/0083990 A1 | | 7/2002 | Lundman | 138/98 |
| 2004/0045718 A1 | | 3/2004 | Brisco et al. | 166/380 |
| 2005/0065660 A1 | | 3/2005 | Aleksandersen et al. | 700/266 |
| 2007/0113622 A1 | | 5/2007 | Buckley et al. | 73/49 |
| 2007/0286682 A1 | | 12/2007 | Freyer et al. | 405/184.1 |
| 2008/0054625 A1 | | 3/2008 | Kamiyama et al. | 285/15 |
| 2008/0072963 A1 | | 3/2008 | Strohmeier et al. | 137/15.13 |

OTHER PUBLICATIONS

International Search Report and Written Opinion issued by the International Searching Authority (ISA/US) in PCT/US2010/026982 on May 4, 2010 (10 pages).

\* cited by examiner

*Primary Examiner* — Patrick F Brinson
(74) *Attorney, Agent, or Firm* — Gable Gotwals

(57) ABSTRACT

A repair device and method for its use includes plugs that pressure isolate an internally damaged pipeline section and an hermetically sealed housing that contains a length of composite material and a means for controllably releasing the composite material. In a preferred embodiment, the composite material is a pre-cured composite plank and the releasing means is a rotatable carriage assembly. The carriage assembly includes pairs of rollers that maintain the composite material in its coiled state and provide for its controlled release onto the interior wall of the pipeline. The carriage assembly also includes a nozzle for injecting an adhesive into a roller. The roller applies the adhesive onto the interior wall surface and then presses the composite material into the adhesive as the carriage assembly rotates and the composite material uncoils. A pneumatic or electric motor may be used to power the carriage assembly.

20 Claims, 5 Drawing Sheets

INTERNAL COMPOSITE REPAIR APPARATUS

REFERENCE TO PENDING APPLICATIONS

This application is not based upon any pending domestic or international patent applications.

FIELD OF THE INVENTION

This invention relates generally to the field of piping and pipeline repair systems. More particularly, the present invention relates to the use of composite materials in providing a piping and pipeline repair system from within the pipeline via wireless positioning and pressure isolation.

BACKGROUND OF THE INVENTION

Piping systems and pipelines are subject to defects such as arc burns, corrosion, cracks, dents, fretting, gouges, and grooves that compromise structural integrity. Because of the potential of a defect to cause catastrophic failure, pipeline operators employ various external and internal inspection methods to evaluate pipeline conditions and identify defects. When a defect is identified, various repair methods are employed based upon such factors as defect location, type, and size. Repair methods include grinding, weld deposit, sleeves, clamps, and hot tapping. Preferably, operators would like to make the repair without having to shutdown or reduce the flow of the pipeline.

An advance in sleeve-type repairs has been the use of composite materials. The composite is typically multiple layers of carbon, glass, or aramid fibers bound together by a polymeric matrix consisting of either epoxy, polyurethane, or vinylester in the form of a patch or wrap. First, the surrounding pipeline surfaces are prepared to receive the composite wrap and filler by grit-blasting or an equivalent process. In a typical repair, putty filler is used to fill any voids in the pipeline created by the defect and to taper uneven welds or misaligned pipes. The surface is then prepared with low viscosity polymeric primer to ensure bonding and load transfer between the repair and the substrate. The structural reinforcing fibers, or fabric, are then saturated with a liquid polymer and the wet fibers are wrapped around the outer pipeline surface. The wrap is then allowed to cure at ambient temperature and atmospheric pressure.

Composite wrap repairs can be difficult and labor intensive due in part to the handling of the wet fibers and the time-sensitive nature of the liquid polymer. As the polymer set-up time or pot life expires, the liquid polymer becomes more viscous and difficult to mold and shape. Unlike cure time, which may be a day or several days, the pot life of many liquid polymers is only a few minutes.

Other types of composite wrap systems include pre-impregnated layers and pre-cured coils. A pre-impregnated system is one that has a polymer applied onto the fibers at the factory; however, the polymer is not fully cured at this stage. Reaction of the polymer is achieved by the addition of heat or a chemical (including water) to the pre-impregnated fiber. This means that a liquid polymer is applied to dry fibers at a factory and the reaction is suspended until heat or some type of chemical is added to the system once it is applied to the pipeline.

In a pre-cured coil, the repair system is shipped from the factory with the polymer completely reacted onto the fibers. Each layer of the repair system is therefore pre-cured and is pre-formed to the pipeline outer diameter. In the field, this pre-cured coil is pulled around the pipeline and an adhesive is applied to each layer to bond the coil together.

Externally applied repair systems present safety concerns. Pipeline operators do not like to work on a pipe directly over a defect under pressure. Yet, in all composite over-wrap systems, the external surface of the pipeline directly above the defect must be cleaned in order for the composite to bond at the defect. If the external pipe was grit-blasted or mechanically cleaned too severely, the cleaning could thin the wall to a point of failure.

To provide for improved safety, a number of patents disclose pressure isolating the repair area. For example, U.S. Pat. No. 6,752,175, issued to Willschuetz et al., discloses a wirelessly controlled pig that engages a sealing element to pressure isolate a section of pipeline in order to perform work, such as hot tapping, from the outside of the pipeline. No provision, however, is provided by Willschuetz et al. for internal pipeline repair with composites. Similarly, U.S. Pat. No. 4,504,204, issued to Koga, discloses a pig train apparatus for use in low pressure distribution lines that employs a tether to guide the pigs into place and transfer resin from above ground tanks to the pigs. The resin is then injected through ports in the pigs. The injected resin, however, is intended to provide a seal rather than a structural repair. Last, U.S. Patent App. No. 2002/0083990, filed by Lundman, discloses a device having an inflatable bladder wrapped with a repair material such as a composite material impregnated with a curable resin. The device, which is tethered and pulled into place, is then inflated to force the repair material against the inner wall of the pipeline. The device, however, does not provide for remote repair or pressure isolation of the repair area, nor is it capable of providing multiple layers of composite material in a single deployment or subsequently moving downstream and applying a second repair.

BRIEF SUMMARY OF THE INVENTION

A repair device according to this invention includes a leading plug and a trailing plug that pressure isolate an internally damaged pipeline section. An hermetically sealed housing located between the plugs contains a length of composite material and a means for controllably releasing the composite material. In a preferred embodiment, the composite material is a pre-cured composite plank and the releasing means is a rotatable carriage assembly.

The carriage assembly includes pairs of rollers that maintain the composite material in its coiled state and provide for its controlled release onto the interior wall of the pipeline. The carriage assembly also includes a nozzle for injecting an adhesive into a roller. The roller applies the adhesive onto the interior wall surface and then presses the composite material into the adhesive as the carriage assembly rotates and the composite material uncoils. A pneumatic or electric motor may be used to power the carriage assembly.

A method of repairing an internally damaged section of pipe or pipeline according to this invention includes the steps of launching a pig train into a pipeline; positioning the pig train within the pipeline so that an internally damaged portion of the pipeline lies between the plugs; setting the plugs so as to pressure isolate the internally damaged portion; opening a housing that contains a composite material and an adhesive; applying the adhesive to an interior circumferential portion of the pipeline wall; and applying a length of composite material to the adhesive. The applying step causes the composite material to transition between a stored and coiled state to a released and expanded state that urges against the adhesive.

During the applying step, a carriage assembly rotates and controllably releases the composite material. As the carriage assembly rotates, the composite material may be pressed into the adhesive layer. If multiple layers of composite are required, one layer of composite may be applied to a previously laid layer of composite.

A better understanding of the repair device and method will be obtained from the following detailed description of the preferred embodiments taken in conjunction with the drawings and the attached claims.

DETAILED DESCRIPTION OF THE PREFERRED EMBODIMENTS

Preferred embodiments of an internal repair apparatus will now be described with reference to the drawings and the following elements:

| | |
|---|---|
| 10 | Repair apparatus |
| 12 | Interior space |
| 14 | Interior wall surface |
| 20 | Leading plug module |
| 30 | Trailing plug module |
| 40 | Housing |
| 42 | First section |
| 44 | Mating edge |
| 46 | Second section |
| 48 | Mating edge |
| 50 | Central shaft |
| 60 | Carriage assembly |
| 62 | Carriage arm |
| 64 | Carriage arm |
| 66 | Motor |
| 68 | Power supply/energy source |
| 70 | Controller means |
| 80 | Pair of rollers |
| 82 | Inner roller |
| 84 | Outer roller |
| 86 | Roller inter-space |
| 90 | Adhesive application system |
| 92 | Adhesive roller |
| 94 | Roller arm assembly |
| 96 | Power supply/energy source |
| 98 | Resin |
| 100 | Hardener |
| 102 | Tubing |
| 104 | Mixing chamber/spray nozzle |
| 108 | Adhesive |
| 110 | Plank |
| 112 | Outer or wall-side surface |
| 114 | Inner or carrier-side surface |

A person of ordinary skill in the art of piping system and pipeline repair using composite materials would recognize that an internal repair apparatus according to this invention is equally applicable to piping as it is to pipelines. Rather than use terms such as "pipeline/piping" or "pipeline/piping system" throughout this disclosure, pipeline is used instead.

Figure 1:
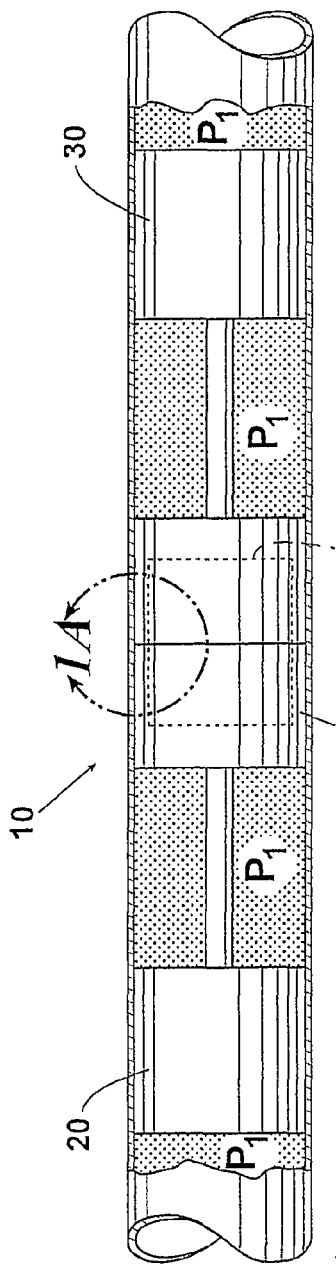
FIG. 1 is a schematic view of a repair device for repairing an internally damaged section of a pipe or pipeline that includes a leading plug, a trailing plug, and a hermetically sealed tandem housing located between the plugs. The repair device provides for remote placement of the housing opposite an internally damaged portion of the pipeline.
Figure 2:
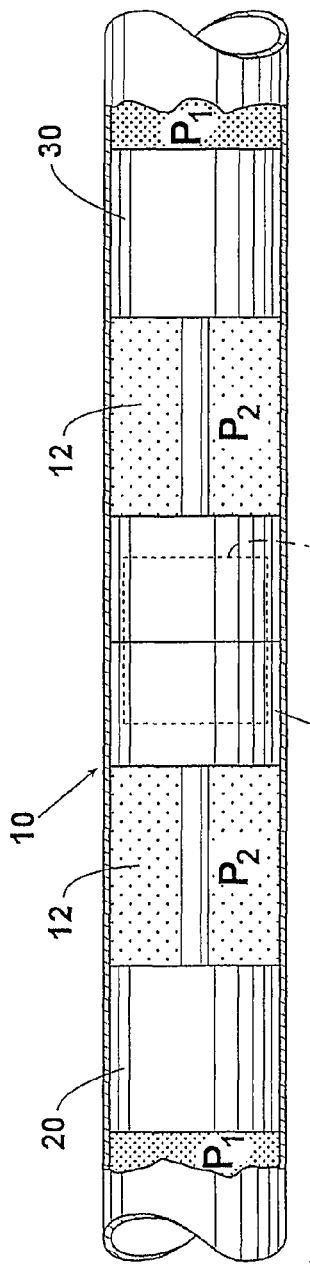
FIG. 2 is a schematic view of the repair device with the plugs in a set and sealed position. The plugs pressure isolate the housing from the pipeline pressure.
Figure 3:
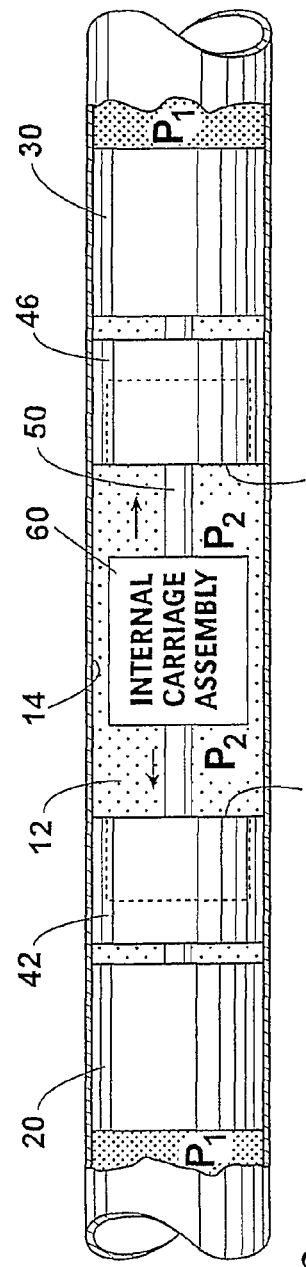
FIG. 3 is a schematic view of the repair device with opposing sections of the tandem housing retracted to expose an internal carriage assembly.

Referring to the drawings and first to FIGS. 1-3, a pipeline contains a pressurized product flow that exerts an outward radial pressure P1 on the walls of the pipeline. Internal corrosion, cracks, erosion and microbiological corrosion create a defect D that compromises the integrity of the pipeline and represents a potential failure point. To provide an internal repair of defect D, a repair apparatus 10 is launched within the pipeline to pressure isolate a circumferential interior space 12 containing defect D and implement a composite material repair.

Repair apparatus 10 is preferably a train arrangement that includes a leading plug module 20, a trailing plug module 30, and a housing 40 located between the sealing plugs 20. Plug modules 20 and 30 are of a type well-known in the art and preferably include a remote control (non-tethered) means for positioning the plug modules 20 and 30 at a predetermined location within the pipeline and actuating the sealing means of each plug module 20, 30. In a preferred embodiment, plug modules 20 and 30 are a T.D. Williamson, Inc. (Tulsa, Okla.) SMARTPLUG™ system tool.

Plug modules 20 and 30 are positioned so as to place and secure housing 40 substantially opposite defect D. After plug modules 20 and 30 are in a set position, sealing means (not shown) engage an opposing circumferential internal wall portion of the pipeline, thereby pressure isolating interior space 12 from pipeline pressure P1 and providing pressure a P2 less than P1. Interior space 12 may be flooded with nitrogen gas to help evacuate any pipeline product contained between modules 20 and 30. Alternatively, interior space 12 may be flooded with nitrogen gas prior to launching modules 20 and 30, in which case pipeline product does not need to be evacuated.

Because each plug module 20, 30 is independently capable of isolating the full pipeline pressure P1, the modules 20 and 30 provide double-block isolation.

During transport to the pipeline section having defect D, housing 40 remains in a closed, hermetically sealed position. Once leading plug module 20 and trailing plug module 30 are in the sealed, set position—and, if required, any remaining pipeline product evacuated from interior space 12—housing 40 may be actuated to expose its interior chamber 50 and contents to interior space 12. Housing 40 may be a mechanical or polymeric tandem housing having a first section 42 and a second section 46. When housing 40 is in the closed, hermetically sealed position, each section 42 and 46 is sealably engaged one to the other along mating edges 44, 48, respectively. Mating edges 44 and 48 may contain parallel and flat mating edges (as illustrated) or notched mating edges (not shown). When housing 40 is in the open position, each section 42, 46 has been fully retracted from the other along central shaft 50 and mating edges 44, 48 are no longer sealably engaged.

Figure 4:
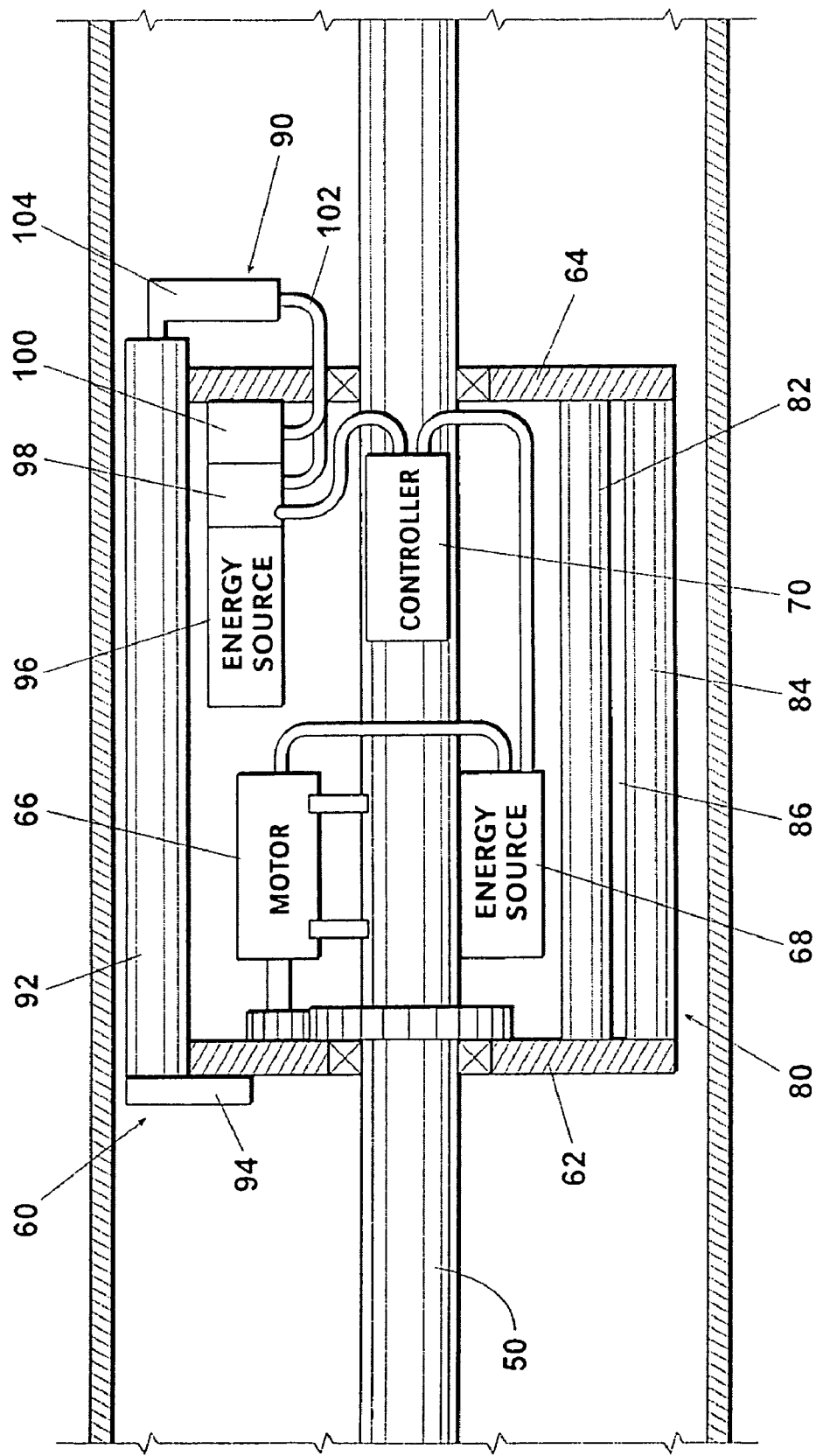
FIG. 4 is a schematic view of the internal carriage assembly. A controller controls two compressed nitrogen sources. The first compressed nitrogen source powers a pneumatic motor that provides for rotation of the carriage assembly and may provide for actuation of an extendable roller arm. The second compressed nitrogen source provides means for a two-part epoxy adhesive for injection into the extendable roller. The carriage assembly may also include a battery power source (not shown) in communication with battery-powered motors instead of pneumatic ones.
Figure 5:
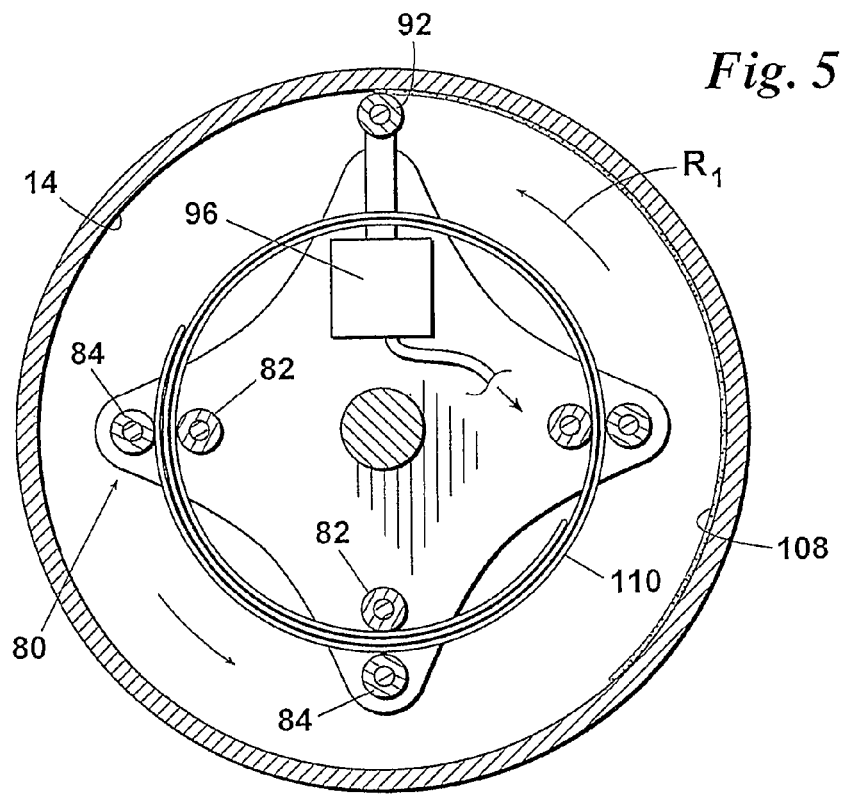
FIG. 5 is a schematic view of the carriage assembly as it rotates within the pipeline section. As the carriage assembly rotates, the extendable roller applies the adhesive onto the inner diameter of the pipeline.

Referring to FIGS. 3-5, housing 40 houses a carrier or carriage assembly 60. Carriage assembly 60 includes a means for applying an adhesive to interior wall surface 14 and a means for controllably releasing and applying a pre-cured composite plank 110 to the adhesive. A controller means 70 is in communication with the means for applying adhesive and for applying plank 110.

Figure 9:
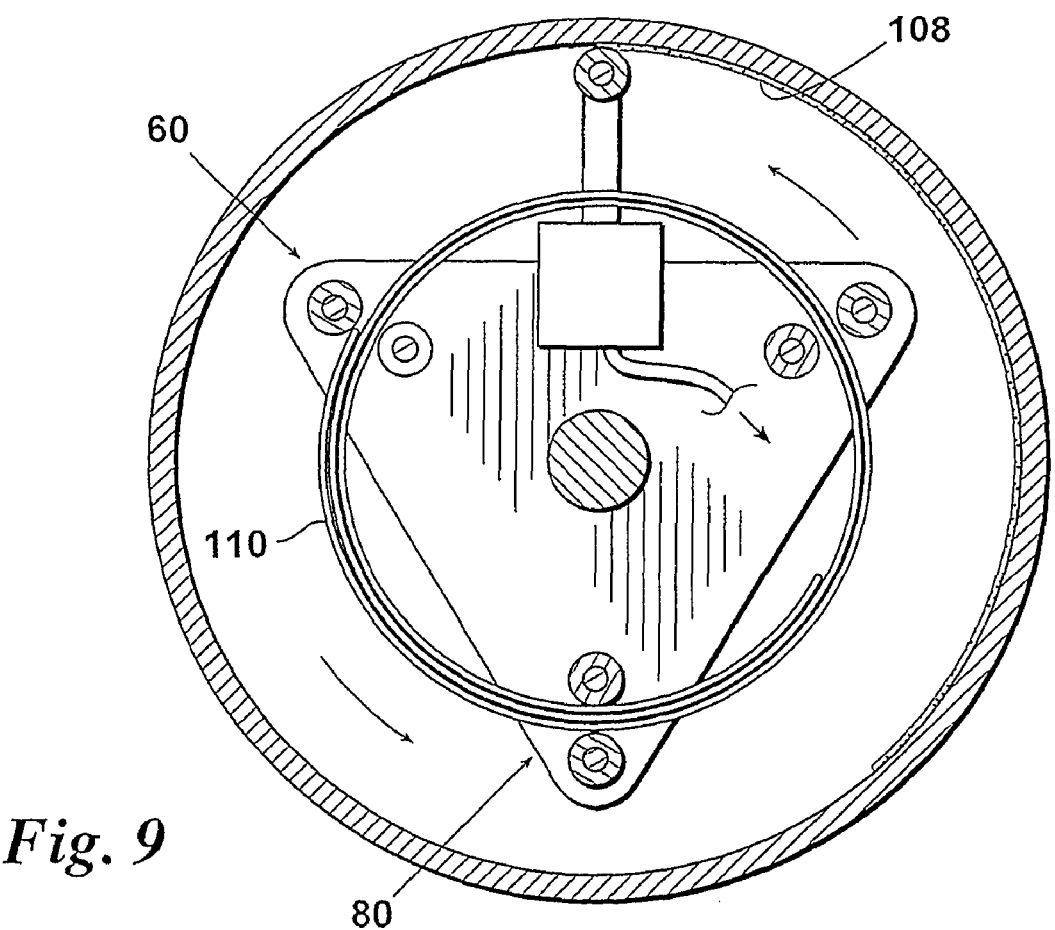
FIG. 9 is a schematic view of the carriage assembly with 120° spacing of the rollers that hold and release the coiled composite plank.
Figure 1A:
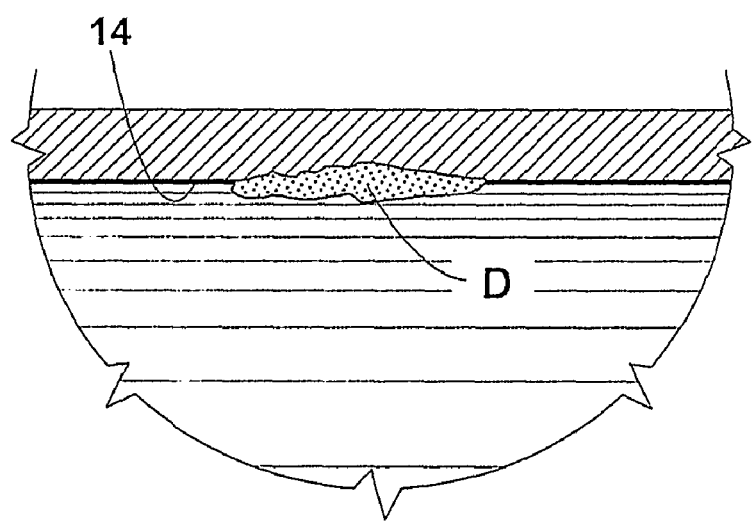

Plank 110 is coiled about carrier assembly 60 by way of a plurality of paired rollers 80. Each paired rollers 80 includes an inner roller 82 and an outer roller 84 that are carried by opposing carriage arms 62 and 64. Preferably, three sets of paired rollers 80 are employed, spaced at 90° or at 120° (see FIGS. 5 & 9).

Plank 110 preferably has a minimum length L that is substantially equal to the circumference C of the internal diameter of the pipeline section. As carriage assembly 110 rotates, the first pair of rollers 80 begins to controllably release an end portion of plank 110. As plank 110 releases it compresses to the internal diameter of the pipeline section and urges against interior wall surface 14. Preferably, plank 110 begins to release after the first complete rotation $R_1$ of carriage assembly 60. Length L or plank 110 may also be a predetermined multiple of circumference C in order to provide multiple layers of composite plank 110 as needed.

One roller 82, 84 (or both rollers 82, 84) in the pair of rollers 80 may be adjustable relative to the other roller 84, 82 in order to provide an inter-space 86 effective for accommodating one or more layers of plank 110 in its stored state between rollers 82 and 84. As each successive layer of plank 110 is released from carriage assembly 60, inter-space 86 may decrease to capture the remaining stored layer or layers. Alternatively, the rollers 82, 84 may remain fixed as plank 110 uncoils and urges against the carrier side of roller 84.

Adhesive application system 80 includes a resin 98 and a hardener 100, or may include a single composite adhesive instead of a plural adhesive system. An energy source 96 such as compressed nitrogen provides pressure to force resin 98 and hardener 100 into a tubing 102 connected to a mixing chamber or nozzle 104. Pressurized fluid source 96 is in communication with a controller means 70. Resin 98 and hardener 100 combine to form an epoxy-based adhesive 108. In another preferred embodiment, adhesive 108 is a one-part solvent suspended adhesive.

Mixing nozzle 104 forces the adhesive 108 into an adhesive roller 92. Alternatively, a linear actuator (not shown) may be provided to provide the pressure required to force adhesive 108 into position. Roller 92 may be in communication with an arm assembly 94 that actuates and extends to place roller 92 in communication with interior wall surface 14. Roller 92 urges against interior wall surface 14 while applying adhesive 108 to wall surface 14.

Figure 6:
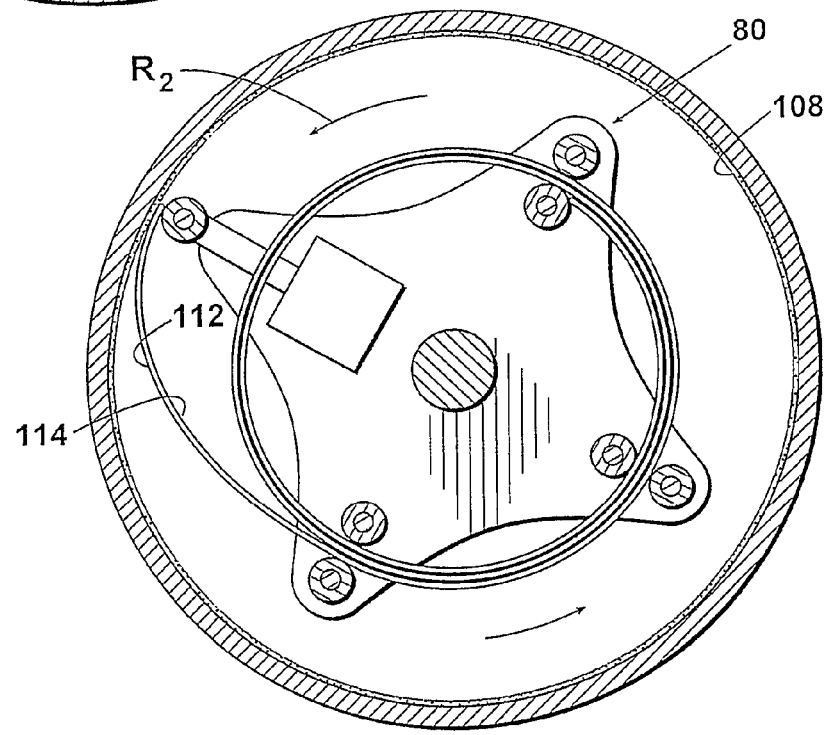
FIG. 6 is a schematic view of the carriage assembly as it continues to rotate a second time. A pre-cured composite plank that is coiled between sets of opposing roller begins to uncoil and expand to the inner wall of the pipeline section. The extendable roller engages the underside of the plank and presses the plank into the adhesive.
Figure 7:
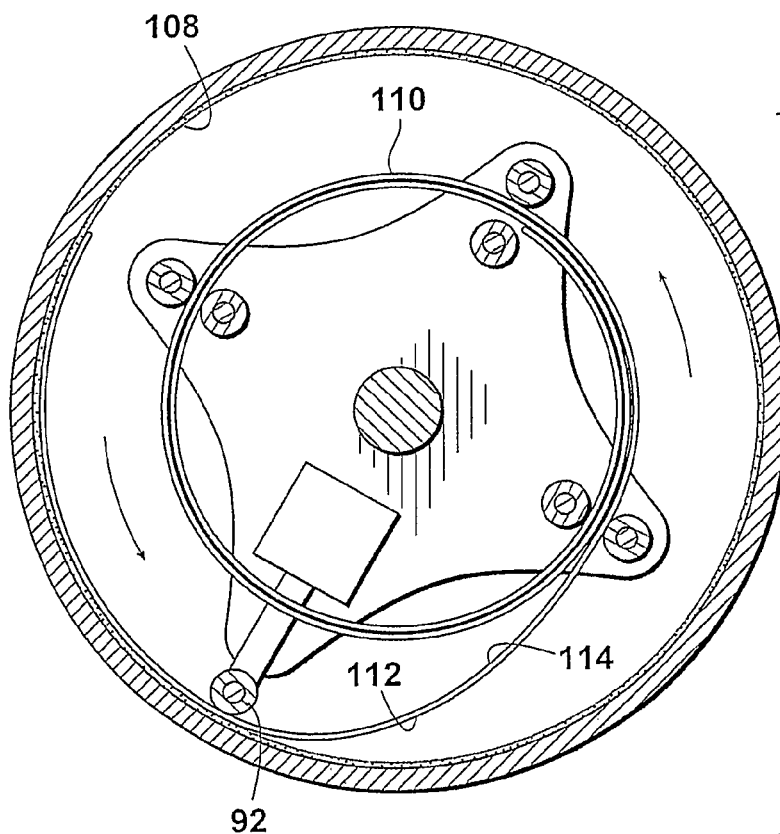
FIG. 7 is a schematic view of the carriage assembly as it continues to rotate and apply the composite plank.
Figure 8:
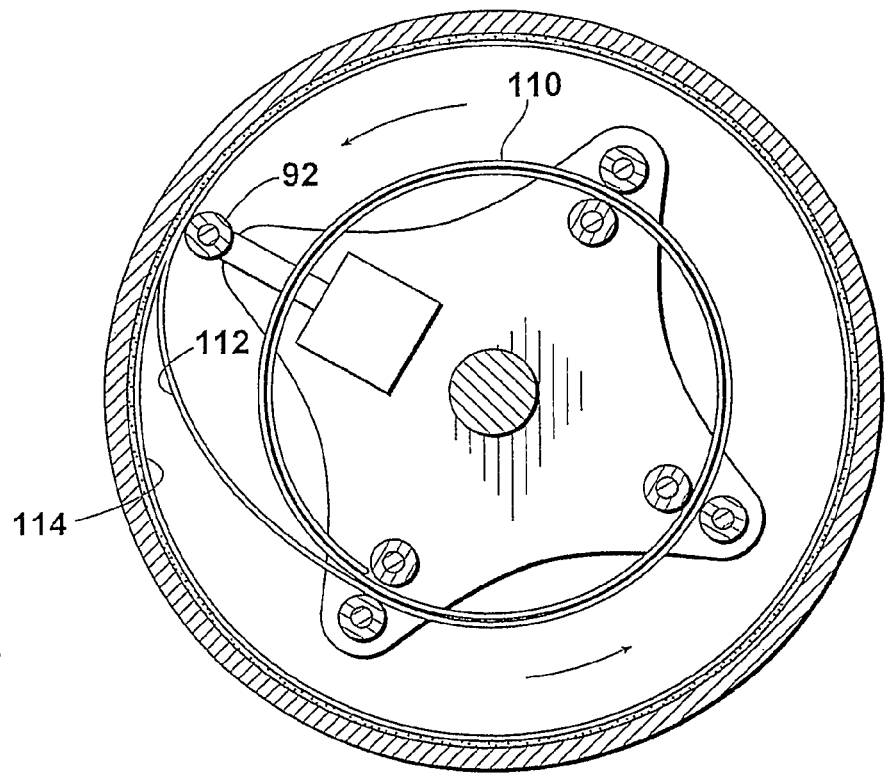
FIG. 8 is a schematic view of the carriage assembly after it has completed applying a first layer of composite plank. A second layer of composite plank may then be applied either directly to the first composite plank or after first applying a second layer of adhesive to the underside of the first composite plank.

Carriage assembly 60 is rotatable about central shall 50. A motor 66 provides a power source to rotate carriage assembly 60. In a preferred embodiment, motor 66 is a pneumatic motor in communication with an energy source 68 such as compressed nitrogen and a controller means 70. In another preferred embodiment, motor 66 is a battery-powered motor configuration. The First complete rotation $R_1$ of carriage assembly 60 applies adhesive 108 to interior wall portion 14. Upon the second rotation $R_2$, plank 110 (or a first or next layer of plank 110) starts to unwind from carrier assembly 60. See FIGS. 6-8. During the rotation $R_2$, the outer or wall-side surface 112 of plank 110 is pressed by roller 82 into the wet adhesive 108 and against interior wall surface 14.

In cases in which plank 110 has a length L that provides for two or more layers of plank 110 to be applied, adhesive 108 can be applied during the third rotation $R_3$ to the exposed carrier-side surface 112 of the just-applied plank layer 110. The fourth rotation $R_4$ unwinds and applies the next layer of composite plank 110. See e.g., FIG. 8. In general, each odd-numbered rotation $R_n$ of carrier assembly 60 applies adhesive—either to the interior wall surface 14 or the carrier-side surface of the just laid plank layer 110—and each successive rotation $R_{n+1}$ unwinds and applies a portion of plank 100 to either the interior wall surface 14 or the carrier-side surface of the previously laid plank layer 110.

While preferred embodiments of internal repair apparatus 10 have been described with a certain degree of particularity, many changes may be made in the details of construction and the arrangement of components without departing from the spirit and scope of this disclosure. The internal repair apparatus invention, therefore, is not limited to the embodiments set forth herein for purposes of exemplification, but is to be limited only by the scope of the attached claims, including the full range of equivalency to which each element thereof is entitled.

What is claimed is:

1. A repair device for repairing an internally damaged section of a pipe or pipeline, the repair device comprising:
    a leading plug and a trailing plug, said plugs pressure isolating an internally damaged pipeline section located between said plugs when said plugs are in a sealed position;
    a housing in communication with said plugs and located between said plugs;
    said housing including a length of composite material and an adhesive and a means for controllably releasing a portion of said length of composite material the pipeline having a product flow and said adhesive being isolated from the pipeline product flow when said plugs are in an unsealed position.

2. A repair device according to claim 1 further comprising said housing being capable of transitioning between a closed hermetically sealed state and an opened unsealed state.

3. A repair device according to claim 1 further comprising said means for controllably releasing being a rotatable carriage assembly.

4. A repair device according to claim 3, said rotatable carriage assembly comprising at least one pair of rollers, said at least one pair of rollers being capable of receiving a portion of said length of composite material between opposing rollers in said at least one pair of rollers.

5. A repair device according to claim 3, said rotatable carriage assembly comprising a nozzle in communication with an adhesive.

6. A repair device according to claim 5 further comprising a first compressed fluid source in communication with said nozzle.

7. A repair device according to claim 3, said rotatable carriage assembly comprising a roller effective for applying at least one of part of an adhesive and said length of composite material to an inner wall surface of the pipeline.

8. A repair device according to claim 7, said roller being capable of moving between a retracted first position and an extended second position relative to an interior wall surface of the internally damaged section of pipeline.

9. A repair device according to claim 3, said carriage assembly further comprising a pneumatic motor in communication with a second compressed fluid source.

10. A repair device according to claim 3, said carriage assembly further comprising an electric motor.

11. A repair device according to claim 1, said length of composite material being a pre-cured composite plank.

12. A method of repairing an internally damaged section of pipe or pipeline, the method comprising the steps of:
- launching a pig train into a pipeline, the pig train including a leading plug, a trailing plug, and a housing in communication with and located between the leading plug and the trailing plug;
- positioning the pig train within the pipeline so that an internally damaged portion of the pipeline lies between the plugs and opposite the housing;
- setting the plugs so as to pressure isolate the internally damaged portion;
- opening the housing;
- applying an adhesive to an interior circumferential portion of the pipeline wall that includes the internally damaged portion; and
- applying a length of composite material to the adhesive, the housing houses the length of composite material said step of applying causes the length of composite material to transition between a stored and coiled state within the housing to a released and expanded state outside of the housing, the length of composite material in the released and expanded state urging against the adhesive.

13. A method according to claim 12, said step of applying a length of composite material including the sub-steps of rotating a carriage assembly and controllably releasing the length of composite material as the carriage assembly rotates.

14. A method according to claim 12, said step applying a length of composite material including the sub-step of pressing a surface of the length of composite material into an adhesive layer.

15. A method according to claim 12 further comprising the step of applying a length of composite material to a previously applied length of composite material.

16. A method according to claim 12, said step of applying an adhesive including the sub-step of rotating a carriage assembly.

17. A method according to claim 12, said step of applying an adhesive including the sub-step of actuating a roller.

18. A method according to claim 12 further comprising the step of applying an adhesive to an inner surface of a previously applied length of composite material.

19. A method according to claim 12 wherein the length of composite material is a pre-cured composite plank of predetermined length L.

20. A repair device for repairing an internally damaged section of a pipe or pipeline, the repair device comprising:
- a leading plug and a trailing plug;
- means for positioning said plugs in a pipeline having a product flow;
- a length of composite material and an adhesive located between said plugs; and
- a means for controllably releasing a portion of said length of composite material and said adhesive;
- said plugs pressure isolating an internally damaged pipeline section located between said plugs when said plugs are in a sealed position;
- said adhesive at all times being isolated from the product flow.

* * * * *